United States Patent
Strong (10) Patent No.: US 10,348,374 B2
(45) Date of Patent: Jul. 9, 2019

(54) METHOD AND APPARATUS FOR CHANNEL SOUNDING FOR A MU-MIMO WIRELESS COMMUNICATION NETWORK

(71) Applicant: Cambium Networks Limited, Ashburton, Devon (GB)

(72) Inventor: Peter Strong, Ipplepen (GB)

(73) Assignee: CAMBIUM NETWORKS LTD, Ashburton, Devon (GB)

( * ) Notice: Subject to any disclaimer, the term of this patent is extended or adjusted under 35 U.S.C. 154(b) by 302 days.

(21) Appl. No.: 15/074,821

(22) Filed: Mar. 18, 2016

(65) Prior Publication Data
US 2017/0288746 A1 Oct. 5, 2017

(30) Foreign Application Priority Data
Mar. 8, 2016 (GB) .................................. 1603978.6

(51) Int. Cl.
*H04L 5/00* (2006.01)
*H04B 7/0452* (2017.01)
(Continued)

(52) U.S. Cl.
CPC ......... *H04B 7/0452* (2013.01); *H04B 7/0617* (2013.01); *H04B 7/0632* (2013.01);
(Continued)

(58) Field of Classification Search
CPC ............................ H04L 5/0048; H04L 5/0073
See application file for complete search history.

(56) References Cited

U.S. PATENT DOCUMENTS 8,594,216 B2 * 11/2013 Van Zelst ............ H04B 7/0413
375/219
8,630,267 B1 * 1/2014 Jin ........................ H04W 16/28
370/252
(Continued)

FOREIGN PATENT DOCUMENTS

EP 2775634 A2 9/2014
WO WO 2008/153360 A1 12/2008
(Continued)

OTHER PUBLICATIONS

International Search Report and The Written Opinion of the International Searching Authority for corresponding International Application No. PCT/GB2017/050599 dated Jun. 20, 2017, 13 pages.
(Continued)

*Primary Examiner* — Parth Patel
(74) *Attorney, Agent, or Firm* — Brinks Gilson & Lione (57) ABSTRACT

In a multi user multiple input multiple output MU-MIMO wireless communication network comprising an access point and subscriber modules, a method of channel sounding comprises forming a respective MU-MIMO beam from the access point to each subscriber module of a first sounding group of subscriber modules by applying a beamforming weightset to a weighting matrix, the beamforming weightset determined based on previously determined channel estimates. Each MU-MIMO beam is used to transmit a respective sounding symbol, each respective sounding symbol being different from each other sounding symbol of the first sounding group. A first sounding symbol is received at a first subscriber module of the first sounding group, and it is determined whether to send a response message to the access point on the basis of a determination of a received level of interference to the first sounding symbol.

15 Claims, 8 Drawing Sheets

(51) Int. Cl.
*H04B 7/10* (2017.01)
*H04B 7/06* (2006.01)
(52) U.S. Cl.
CPC ............. *H04B 7/0645* (2013.01); *H04B 7/10* (2013.01); *H04L 5/0023* (2013.01); *H04L 5/0048* (2013.01); *H04L 5/0057* (2013.01); *H04L 5/0073* (2013.01)

(56) References Cited

U.S. PATENT DOCUMENTS

| | | | | |
|---|---|---|---|---|
| 8,934,328 B2* | 1/2015 | Shapira | ................ | H04B 7/0452 370/204 |
| 9,253,767 B2* | 2/2016 | Wang | .................... | H04L 5/0094 |
| 2007/0286303 A1* | 12/2007 | Yamaura | .............. | H04B 7/0421 375/267 |
| 2009/0207765 A1* | 8/2009 | Yamaura | .............. | H04B 7/0417 370/310 |
| 2009/0268698 A1* | 10/2009 | Lee | ...................... | H04B 7/0689 370/336 |
| 2010/0195752 A1* | 8/2010 | Lee | ...................... | H04B 7/0452 375/267 |
| 2010/0202503 A1* | 8/2010 | Dietl | .................... | H04B 7/0417 375/227 |
| 2011/0200081 A1* | 8/2011 | Guo | ..................... | H04B 7/0417 375/224 |
| 2011/0274003 A1* | 11/2011 | Pare, Jr. | ................ | H04B 7/0452 370/252 |
| 2012/0063336 A1* | 3/2012 | Shany | .................. | H04B 7/0452 370/252 |
| 2014/0050280 A1* | 2/2014 | Stirling-Gallacher | ....................... | H04B 7/0486 375/296 |
| 2014/0254517 A1* | 9/2014 | Nam | ..................... | H04B 7/0417 370/329 |
| 2015/0304011 A1* | 10/2015 | Ponnuswamy | ....... | H04B 7/0452 370/329 |
| 2016/0080052 A1* | 3/2016 | Li | ......................... | H04B 7/0456 375/267 |
| 2016/0088648 A1* | 3/2016 | Xue | ...................... | H04B 7/0452 370/252 |
| 2016/0295581 A1* | 10/2016 | Ghosh | ............... | H04W 72/0446 |
| 2016/0380730 A1* | 12/2016 | Ghosh | .................. | H04W 24/10 370/329 |
| 2017/0251392 A1* | 8/2017 | Nabetani | .............. | H04B 7/0452 |

FOREIGN PATENT DOCUMENTS

WO WO 2011/138777 A2 11/2011
WO WO 2015/161319 A1 10/2015

OTHER PUBLICATIONS

Great Britain Combined Search and Examination Report for corresponding Great Britain Application No. GB1603978.6 dated Sep. 1, 2016, 6 pages.

* cited by examiner

METHOD AND APPARATUS FOR CHANNEL SOUNDING FOR A MU-MIMO WIRELESS COMMUNICATION NETWORK

CROSS-REFERENCE TO RELATED APPLICATIONS

This application claims the benefit of UK Application No. GB 1603978.6, filed Mar. 8, 2016, which is incorporated by reference in its entirety

TECHNICAL FIELD

The present invention relates generally to channel sounding in a multi user multiple input multiple output (MU-MIMO) wireless communication network comprising an access point and a plurality of subscriber modules, and particularly, but not exclusively, to a method of channel sounding using channel sounding symbols.

BACKGROUND

Modern wireless communication networks are typically placed under great demands to provide high data capacity within the constraints of the allocated signal frequency spectrum. In cellular wireless communication networks, capacity may be increased by re-using frequencies between cells, typically according to a predetermined frequency re-use pattern. A fixed wireless access system may comprise a base station, which may be referred to as an access point, typically mounted on an antenna tower, and a number of subscriber modules installed at customer premises. The area of coverage of an access point may be divided into sectors, each sector being used to transmit and receive with a respective cell. Capacity may be further increased within a cell by steering respective beams towards specific user equipments, which may be referred to as subscriber modules, to allow communication between the access point with improved gain and/or reduced interference reception in comparison with a beam covering a sector. The access point may be equipped with an antenna array and a beamformer for each sector, for forming beams for communication with each respective subscriber module. Capacity may be increased still further by employing Multi-User Multiple Input Multiple Output (MU-MIMO) beamforming, in which respective beams may be simultaneously directed at different subscriber modules selected for a MU-MIMO group, each beam carrying different data. The subscriber modules selected for membership of a MU-MIMO group have sufficient spatial separation that each beam may be directed at one member of the group, while a null is steered to the other members of the group, to avoid interference between groups.

A set of MU-MIMO beams may be formed by applying a beamforming weightset to a weighting matrix. The weighting matrix takes a number of input signals, and applies appropriate amplitude and phase weights to each input signal for transmission from each element of an antenna array, in order to form the respective MU-MIMO beam to transmit each input signal to the respective subscriber module. The beamforming weightset may be calculated on the basis of channel estimates, which relate to the amplitude and phase characteristic of the radio frequency propagation path through each transmit chain and each element of the antenna at the access point to each subscriber unit. The channel estimates may be calculated on the basis of sounding symbols having pre-determined phase and amplitude characteristics, which may be transmitted from the access point for reception at subscriber modules. The subscriber modules may then determine the channel estimates from the phase and amplitude characteristics of the received sounding symbols, and send response messages back to the access point indicating the determined channel estimates. However, the signaling overhead in sending the sounding symbols and responding by sending channel estimates can be heavy, and may limit capacity available for payload.

It is an object of the invention to mitigate the problems of the prior art.

SUMMARY

In accordance with a first aspect of the invention there is provided a method of channel sounding for a multi user multiple input multiple output MU-MIMO wireless communication network comprising an access point and a plurality of subscriber modules, comprising:

forming a respective MU-MIMO beam from the access point to each subscriber module of a first sounding group of subscriber modules by applying a beamforming weightset to a weighting matrix, the beamforming weightset having been determined on the basis of previously determined channel estimates;

using each MU-MIMO beam to transmit a respective sounding symbol, each respective sounding symbol being different from each other sounding symbol of the first sounding group;

receiving a first sounding symbol at a first subscriber module of the first sounding group; and determining whether to send a response message to the access point in response to the receipt of the first sounding symbol on the basis of a determination of a received level of interference to the first sounding symbol.

This allows for an efficient channel sounding method by reducing signaling overhead. A single timeslot may be used to simultaneously poll all subscriber modules in a sounding group by sending a respective sounding symbol to each subscriber module using a respective MU-MIMO beam. A subscriber module is able to decide whether the previously determined channel estimates are accurate on the basis of reception of the sounding symbol, and may only respond if the channel estimates were determined to be inaccurate. If interference is received to the sounding symbol, then the weighting matrix used to determine the MU-MIMO beams may be assumed to have been based on inaccurate or out of date channel estimates, because if the weighting matrix had been based on accurate channel estimates, then it would be expected that the sounding symbols transmitted on the MU-MIMO beams to the other subscriber modules of the sounding group would not be received at the subscriber module, or would be received at a very low level. Because each sounding symbol of the sounding group is different, reception of a sounding symbol not intended for a given subscriber module may be detected as interference to the intended sounding symbol.

In an embodiment of the invention, each sounding symbol has a respective assigned set of sub-carriers, the assigned set of sub-carriers being energised and non-assigned subcarriers being suppressed, and determining whether to send a response message comprises determining a level of at least one subcarrier that is not in the assigned set for the first subscriber module.

This allows an efficient method of determining whether or not to send a response message. If power is received on non-assigned subcarriers, then the weighting matrix used to determine the MU-MIMO beams may be assumed to have been based on inaccurate or out of date channel estimates, because if the weighting matrix had been based on accurate channel estimates, then it would be expected that subcarriers of sounding symbols transmitted on the MU-MIMO beams to the other subscriber modules of the sounding group would not be received, or would be received at a very low level.

In an embodiment of the invention, each subcarrier assigned in an assigned set for a sounding symbol is not allocated to another assigned set for another sounding symbol of the first sounding group.

This allows each sounding symbol to be orthogonal to each other sounding symbol of the first sounding group, thereby allowing efficient detection of interference between sounding symbols.

In an embodiment of the invention, said determining whether or not to send the response message comprises determining whether or not subcarriers that are not in the assigned set for the first subscriber module are received above a threshold relative to a received level of subcarriers in the assigned set.

This provides a convenient method of determining the degree of suppression of non-assigned subcarriers.

In an embodiment of the invention, said determining whether or not subcarriers that are not in the assigned set for the subscriber module are received above the threshold is based on a mean error of received power on subcarriers that are not in the assigned set.

This allows a reliable estimate of the level of received power on non-assigned subcarriers.

In an embodiment of the invention, the threshold is sent in a control message from the access point to the first subscriber module.

This allows the access point to control the amount of signaling traffic by controlling the sending of response messages.

In an embodiment of the invention, the response message comprises at least one metric indicating phase and/or amplitude of signals received on subcarriers that are not in the assigned set for the first subscriber module.

This allows the access point to assess the quality of the channel estimates used to generate the beamforming weightset.

In an embodiment of the invention, the metric is an error vector. The error vector may comprise an average relative phase and amplitude relative to the phase and amplitude of subcarriers in the assigned set.

This provides a convenient method of indicating amplitude and phase. In an embodiment of the invention, the response message comprises a respective error vector for each assigned set, wherein there is an assigned set for each polarisation for each subscriber module in the first sounding group.

This may allow the access point to update of the channel estimates on the basis of amplitude and phase residues from each MU-MIMO beam.

In an embodiment of the invention, each assigned set comprises 30 subcarriers and the first sounding group comprises 7 subscriber modules, there being an assigned set for each polarisation.

This provides a convenient implementation.

In an embodiment of the invention, the method comprises selecting subscriber modules to be members of the first sounding group on the basis of angular separation.

This allows the selection of the sounding group to be suitable for use as a MU-MIMO group.

In an embodiment of the invention, the first sounding group does not have the same members as a MU-MIMO group for transmitting payload data.

This allows polling of subscriber modules which may not have data to send or receive, which may not be included in a MU-MIMO data group.

In accordance with a second aspect of the invention, there is provided a multi user multiple input multiple output MU-MIMO wireless communication network comprising the access point and a plurality of subscriber modules configured to perform the claimed method.

In accordance with a third aspect of the invention, there is provided a method of operating an access point for a multi user multiple input multiple output MU-MIMO wireless communication network comprising the access point and a plurality of subscriber modules, the method comprising:

forming a respective MU-MIMO beam from the access point to each subscriber module of a first sounding group of subscriber modules by applying a beamforming weightset to a weighting matrix, the beamforming weightset having been determined on the basis of previously determined channel estimates;

using each MU-MIMO beam to transmit a respective sounding symbol, each respective sounding symbol being different from each other sounding symbol of the first sounding group, whereby to enable each subscriber module to determine whether or not to send a response message to the access point in response to the receipt of the respective sounding symbol on the basis of a determination of a received level of interference to the first sounding symbol.

In accordance with a fourth aspect of the invention, there is provided a an access point for use in a multi user multiple input multiple output MU-MIMO wireless communication network comprising the access point and a plurality of subscriber modules, the access point being configured to perform the claimed method.

In accordance with a fifth aspect of the invention, there is provided a method of operating a subscriber module in a multi user multiple input multiple output MU-MIMO wireless communication network comprising an access point and a plurality of subscriber modules, the method comprising:

receiving a first sounding symbol at the subscriber module, the subscriber module being in a first sounding group of subscriber modules, the first sounding symbol having been transmitted from the access point in a first MU-MIMO beam, the first MU-MIMO beam having been formed using a weighting matrix to form a respective MU-MIMO beam from the access point to each subscriber module of the first sounding group to transmit simultaneously a respective sounding symbol for each beam to each subscriber module, each respective sounding symbol being different from each other sounding symbol of the first sounding group, the beamforming weightset for the weighting matrix having being determined on the basis of previously determined channel estimates; and determining whether to send a response message to the access point in response to the receipt of the first sounding symbol on the basis of a determination of a received level of interference to the first sounding symbol.

In accordance with a sixth aspect of the invention, there is provided a subscriber module for use in a multi user multiple input multiple output MU-MIMO wireless communication network comprising an access point and a plurality of subscriber modules, the subscriber module being configured to perform the claimed method.

Further features of the invention will be apparent from the following description of preferred embodiments of the invention, which are given by way of example only.

DETAILED DESCRIPTION

By way of example, embodiments of the invention will now be described in the context of a fixed wireless access system operating a time division duplex system based on IEEE 802.11 standards at carrier frequencies typically between 5 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands.

Figure 1:
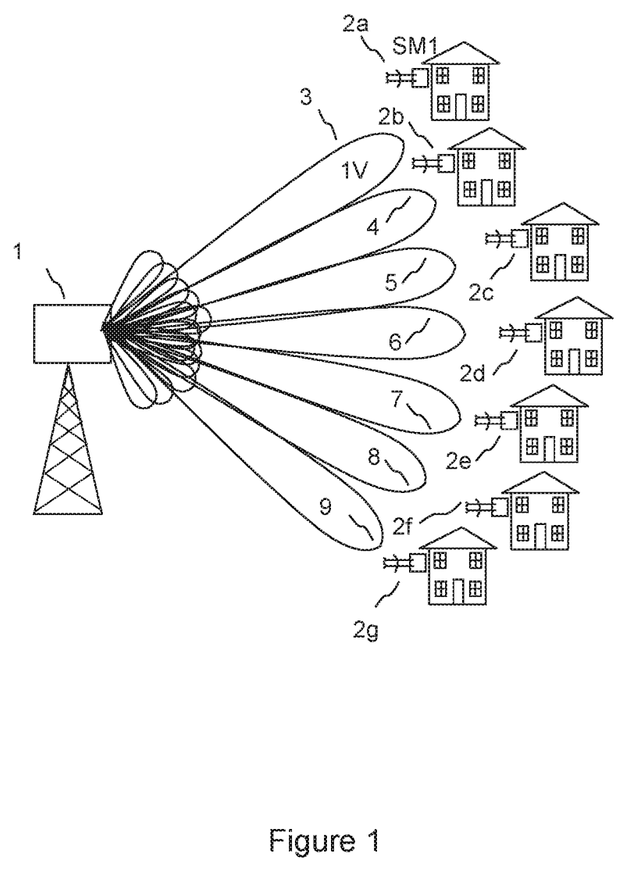
FIG. 1 is a schematic diagram showing transmission of respective sounding symbols from an access point using respective MU-MIMO beams to subscriber modules which are members of a sounding group in an embodiment of the invention.

FIG. 1 is a schematic diagram showing an access point 1 according to an embodiment of the invention in a multi user multiple input multiple output (MU-MIMO) point to multipoint wireless communication network comprising the access point and subscriber modules 2a-2g. In this example, the access point is mounted on a tower, and the subscriber modules are fixed to buildings, for example to provide a data service such as internet access to homes and businesses. The access point 1 has an array of antenna elements, each element being arranged to transmit signals that are appropriately weighted in amplitude and phase to form, in this example, seven MU-MIMO beams 3-9 in a MU-MIMO mode of operation. In a data transmission mode, a respective beam is formed for each of multiple data streams using a beamforming weights matrix. So, for example, different payload data may be transmitted simultaneously to each subscriber module 2a-2g. Each beam is typically arranged to form a null in the direction of the other beams, so reducing interference between beams. The appropriately weighted signals for each beam are combined by superposition in the beamforming matrix to form a combined weighted signal for transmission by each antenna element. Signals may be separately combined to form a beam at each polarisation. In FIG. 1, beams at only one polarisation are shown for clarity, in this case vertical polarisation, V, but a further set of beams at a second orthogonal polarisation may also be formed, for example horizontal polarisation, H. Furthermore, polarisation may be controlled in a beam by appropriate weighting of signals for antenna elements at different polarisations, so that beams may be formed at two polarisations orthogonal to each other, but not purely of polarisations corresponding to those of the elements of the antenna.

The subscriber modules 2a-2g shown in FIG. 1 may be subscriber modules which have been selected for membership of a MU-MIMO group on the basis that they have sufficient spatial separation that each beam may be directed at one member of the group, while a null may be steered to the other members of the group, to avoid interference between members of a group.

Figure 2:
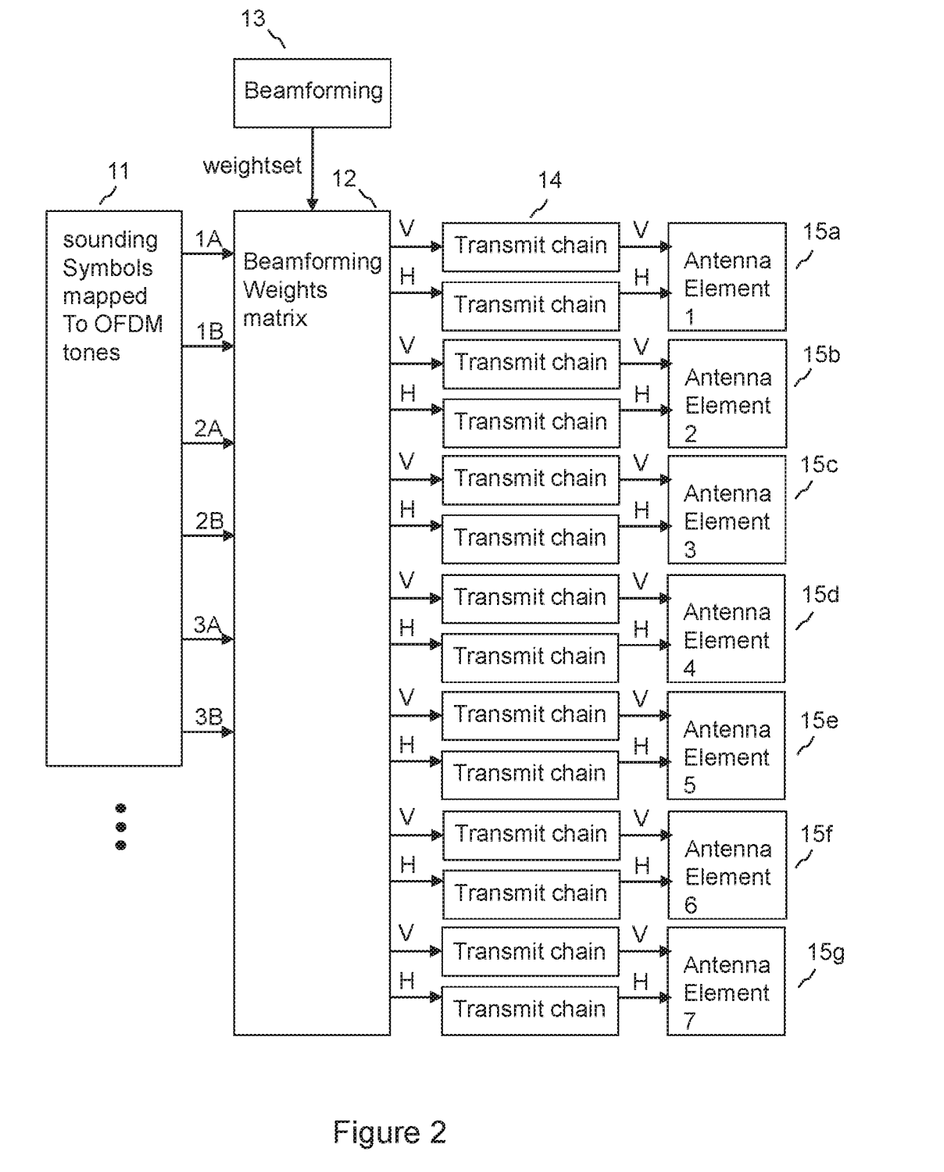
FIG. 2 is a schematic diagram showing a transmission architecture for an access point having a beamforming weights matrix for simultaneous transmission of multiple MU-MIMO beams carrying sounding symbols in an embodiment of the invention.

FIG. 2 is a schematic diagram showing a transmission architecture for the transmission of MU-MIMO beams at the access point. FIG. 2 shows the transmission of sounding symbols using MU-MIMO beams in a sounding mode of operation. A similar architecture is also used to transmit payload data using MU-MIMO beams in a data transmission mode in which payload data is mapped to Orthogonal Frequency Division Multiplexing (OFDM) tones to be passed to the beamforming weights matrix 12 for the forming of MU-MIMO beams instead of the sounding symbols shown in FIG. 2.

For each MU-MIMO beam, two sets of OFDM tone values may created, A and B. In data transmission mode, if a polarisation diversity transmit scheme is used, then A will be a duplicate of B, so that the same data may be transmitted on both polarisations of a beam. This gives robust operation. If a polarising multiplexing approach is taken, then the data stream will be split between steam A and stream B of OFDM tone values, so that stream A and stream B are different for each beam and each carries part of the data stream. This increases data capacity. An OFDM tone value is a representation of an amplitude and phase of a tone, also referred to as a subcarrier, for an OFDM symbol. This may be typically a vector having an Inphase and Quadrature value. Data may be encoded in the tone value using QAM (Quadrature Amplitude Modulation) modulation.

In a sounding mode, respective sounding symbols may be mapped to A and B channels, for sounding of each respective MU-MIMO beam.

In both data transmission and sounding modes, streams of tone values A and B for each MU-MIMO beam are fed to the beamforming weights matrix 12. A sounding symbol is typically not used to send data, and each energised tone typically has the same amplitude and a predetermined phase. The sounding symbol may have tones generated by an inverse fast fourier transform (IFFT) in a similar manner to an OFDM tone used for data transmission, and in this sense the sounding symbol may be described as having OFDM tones.

FIG. 2 shows channels 1A and 1B input to the beamforming weights matrix 12 for transmission on a first MU-MIMO beam at vertical and horizontal polarisations respectively, channels 2A and 2B input to the beamforming weights matrix 12 for transmission on a second MU-MIMO beam at vertical and horizontal polarisations respectively, and channels 3A and 3B for transmission on a third MU-MIMO beam at vertical and horizontal polarisations respectively. However, channels A and B need not be mapped onto only pure vertical and horizontal polarisations; channel A may for example, be mapped to a polarisation formed as a suitably weighted combination of vertical and horizontal polarisation, and channel B may be mapped to a different, typically orthogonal, weighted combination of vertical and horizontal polarisation.

The beamforming weights matrix 12 applies a weightset generated by a beamforming function 13 to the streams of OFDM tone values.

Figure 3:
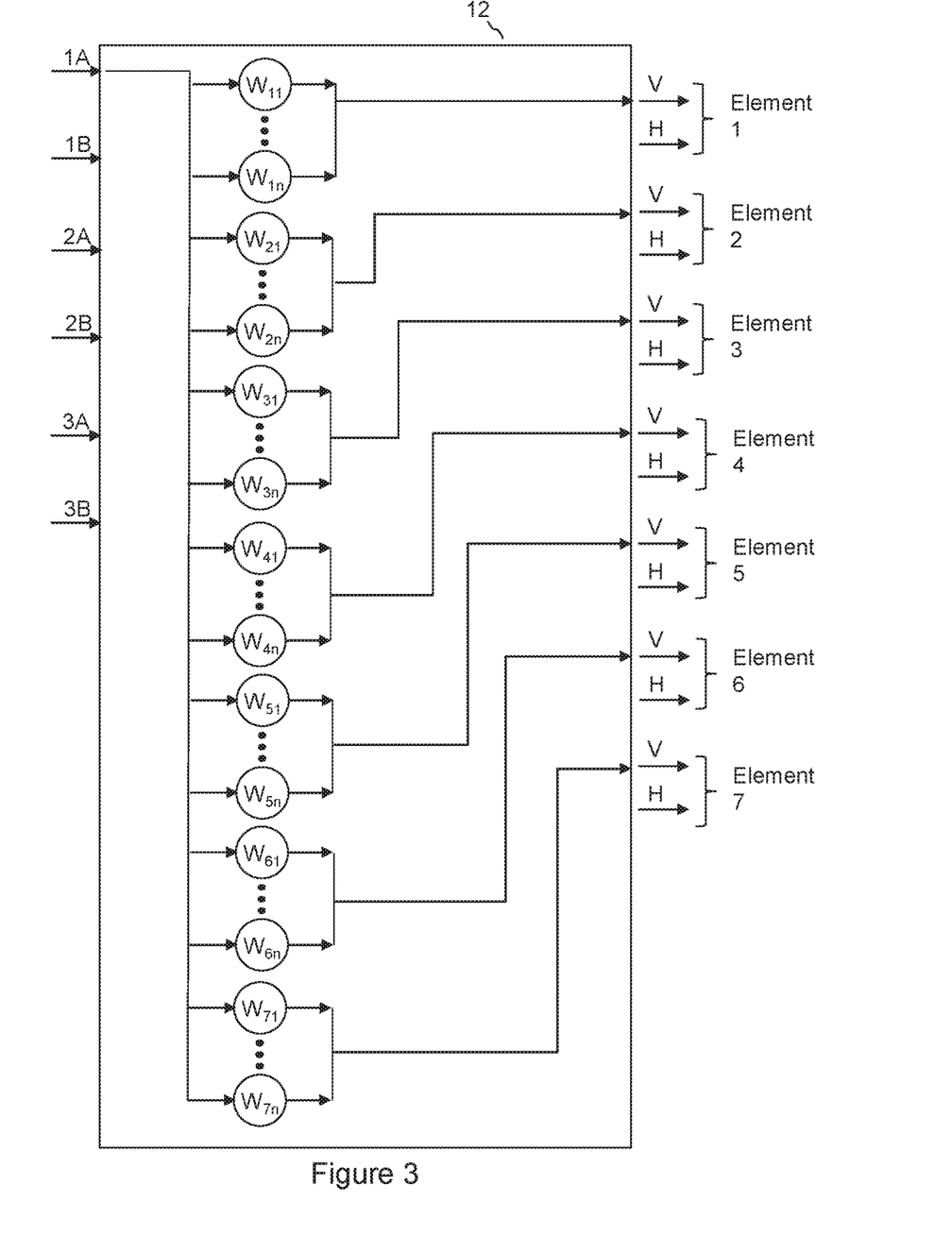
FIG. 3 is a schematic diagram showing a beamforming weights matrix for a beam in an embodiment of the invention.

FIG. 3 shows an example of a beamforming weights matrix 12. As shown in FIG. 3, an input 1A of OFDM tone values is weighted to give weighted OFDM tone values for transmission from each respective, in this example, vertically polarised antenna element. To form a beam on the V (vertical) polarisation, each OFDM tone is weighted by a respective weighting value W11-W1$n$, where n is the number of tones to be weighted in an OFDM symbol, for the V channel of element 1. Similarly, the OFDM tone is weighted by a respective weighting value W21-W2$n$, for the V channel of element 2, and similarly each OFDM tone is weighted by a set of weighting values for each element of the antenna array. An OFDM tone may also be referred to as a subcarrier.

Similar weighting arrangements (not shown) may be provided for further beams. Furthermore, each input may be separately weighted for transmission in each polarisation. Weighted tones for each beam may be combined together by superposition for transmission to a respective transmit chain.

So, each OFDM tone value may be weighted in amplitude and phase by a respective weight value for each nominally vertically polarised (V) and horizontally polarised (H) component for each antenna element. The weighting is typically performed using complex I (Inphase) and Q (Quadrature) components. The weight applied may be different for different subcarriers, i.e the weight may be frequency dependent. This allows beamforming to take into frequency dependent effects. The weightset is calculated by the beamforming function to form an appropriate beam shape when transmitted from the antenna array. The weighted OFDM tone values for respective V and H components for respective antenna elements are fed to respective transmit chains 14 as shown in FIG. 2.

The beamforming weightset for beamforming weights matrix 12 may be calculated on the basis of previous channel estimates, which relate to the amplitude and phase characteristic of the radio frequency propagation path through each transmit chain and each element of the antenna at the access point to each subscriber unit. The channel estimates may be calculated on the basis of sounding symbols having predetermined phase and amplitude characteristics, which may be transmitted from the access point for reception at subscriber modules. The subscriber modules may then determine the channel estimates from the phase and amplitude characteristics of the received sounding symbols, and send response messages back to the access point indicating the determined channel estimates.

Figure 4:
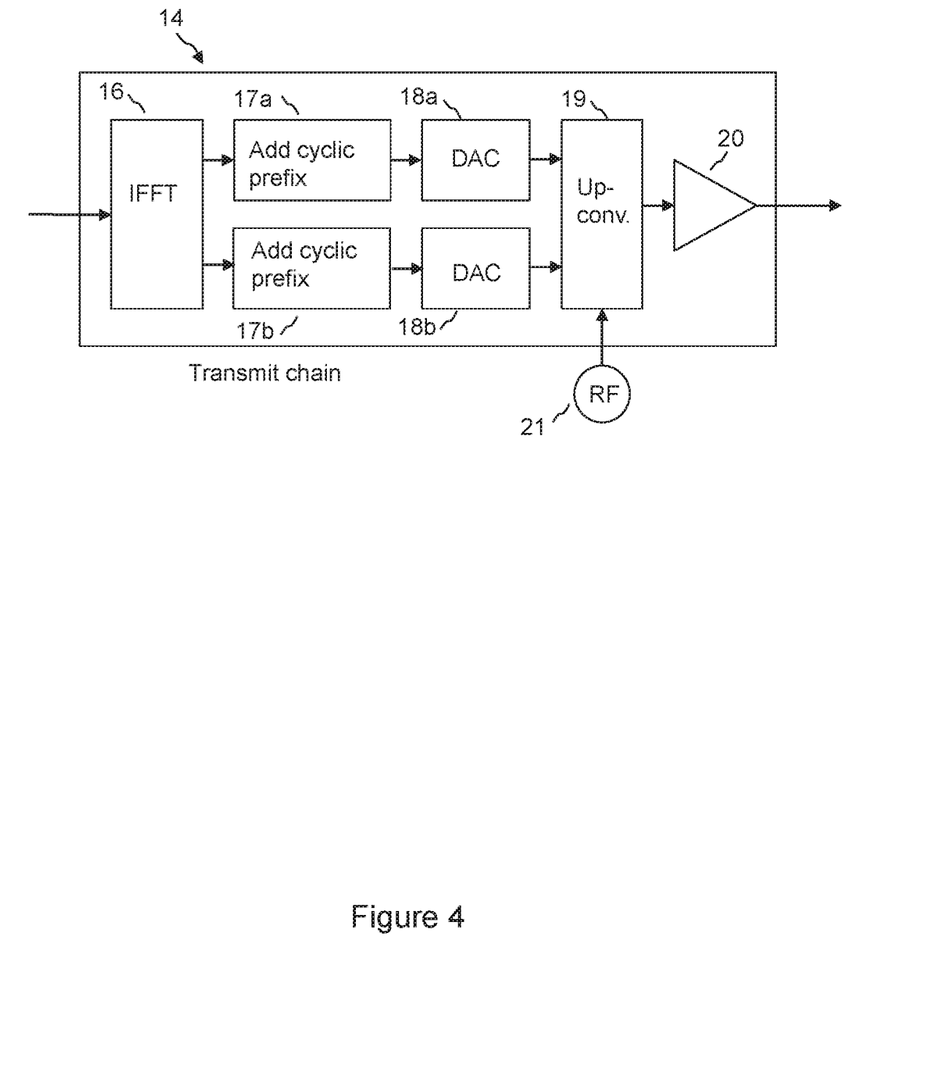
FIG. 4 is a schematic diagram showing a transmit chain.

FIG. 4 is a block diagram showing the components of a typical transmit chain 14. OFDM tone values, having been appropriately weighted, are applied to IFFT block 16, which forms an OFDM symbol in the time domain by applying an Inverse Fourier Transform to a set of OFDM tone values for subcarriers of the symbol. Inphase and quadrature streams of time domain samples are formed at the output of the IFFT block. It is noted that the input to the IFFT block is typically also in Inphase (I) and Quadrature (Q) form, but this is shown in FIG. 4 by a single arrow to be compatible with the format of FIG. 3, which also uses a single arrow to represent Inphase and Quadrature components. A cyclic prefix is added 17$a$, 17$b$ to each of the Inphase and Quadrature streams of time domain samples for the symbol at the output of the IFFT block. Each stream of time samples is converted to the analogue domain by a DAC (Digital to Analogue converter 18$a$, 18$b$. Each analogue signal is then upconverted by up converter 19, which typically includes a complex IQ modulator and radio frequency mixers and amplifiers to translate the typically baseband Inphase and Quadrature signals up in frequency, using a radio frequency signal source 21. The modulated signals are then typically amplified by power amplifier 20, and fed to an appropriate polarisation input of an antenna array element, typically a patch antenna, or a single antenna element formed from an array of patches, for example a vertical array of patches.

Returning to FIG. 2, analogue signals at radio frequency are output from respective transmit chains and connected to respective antenna elements of an array of antenna elements is shown 15$a$-15$g$, in this case an array of 7 elements, each element having an input for transmission on each of two orthogonal polarisations, in this case nominally vertical V and horizontal H. Radiation from each antenna element combines to form an appropriately shaped beam. The weightsets applied for each polarisation may be independent, so that beams may be formed independently on each polarisation.

For data transmission mode, there may be a number of data streams up to the number of simultaneous MU-MIMO beams to be transmitted. For sounding mode, there may be a number of sounding symbols up to the number of simultaneous MU-MIMO beams to be transmitted.

Embodiments of the invention provide a method of channel sounding for a multi user multiple input multiple output MU-MIMO wireless communication network comprising an access point and a plurality of subscriber modules. This may used to determine channel estimates for use in determining a beamforming weightset for use in a data transmission mode to form MU-MIMO beams.

In an embodiment of the invention, a respective MU-MIMO beam is formed from the access point to each subscriber module in a sounding group by applying a beamforming weightset to a weighting matrix, the beamforming weightset having been determined on the basis of previously determined channel estimates. Each MU-MIMO beam is used to transmit a respective sounding symbol, each respective sounding symbol being different from each other sounding symbol of the sounding group.

One of the transmitted sounding symbols is received at a subscriber module which is in the sounding group, and it is determined whether to send a response message to the access point in response to the receipt of the first sounding symbol on the basis of a determination of a received level of interference to the first sounding symbol. The subscriber module is able to decide whether the previously determined channel estimates are accurate on the basis reception of the sounding symbol, and may only respond if the channel estimates were determined to be inaccurate. If interference is received to the sounding symbol, then the weighting matrix used to determine the MU-MIMO beams may be assumed to have been based on inaccurate or out of date channel estimates, because if the weighting matrix had been based on accurate channel estimates, then it would be expected that the sounding symbols transmitted on the MU-MIMO beams to the other subscriber modules of the sounding group would not be received, or would be received at a very low level. Because each sounding symbol of the sounding group is different, reception of a sounding symbol not intended for a given subscriber module may be seen as interference to the intended sounding symbol. This approach may be particularly sensitive for detecting a change in the channel from that estimated based on the previous channel estimates, because the nulling of other subscriber units is particularly sensitive to a change in the channel characteristics. In an embodiment, with energised subcarriers for each symbol corresponding to non-energised sub-carriers for other members of the sounding group, the sensitivity is particularly good.

A single timeslot may be used to simultaneously poll all subscriber modules in a sounding group by sending a respective sounding symbol to each subscriber module using a respective MU-MIMO beam for each subscriber module.

In an alternative system, all the sounding symbols could be the same, and a decision may be made as to whether to send a response message on the basis of whether the received symbol differed from a pre-determined expected symbol. However, this alternative system may be less sensitive for detecting a change in the channel, because the interference from other symbols would resemble the wanted symbol, and so would be more difficult to detect. So, it would be more difficult to detect whether or not good nulling of other subscriber units is being maintained.

A sounding group is a group of subscriber modules to which sounding symbols may be sent simultaneously. Subscriber modules may be selected to be members of the sounding group on the basis of angular separation. The sounding group may be selected to be the same as a MU-MIMO group of subscriber modules used in data transmission mode, or the sounding group may have different members from the MU-MIMO group. The subscriber modules may be selected for membership of a sounding group on the basis that they have sufficient spatial separation that each beam may be directed at one member of the group, while a null may be steered to the other members of the group, to avoid interference between groups. A similar selection criterion may be applied for electing the members of a MU-MIMO group used in data transmission mode, but in data transmission mode the additional criterion may be applied that the subscriber modules have data to receive or send. This criterion may not necessarily be applied to the selection of subscriber modules for membership of a sounding group. This allows polling of subscriber modules which may not have data to send or receive, which may not be included in a MU-MIMO data group.

Figure 5:
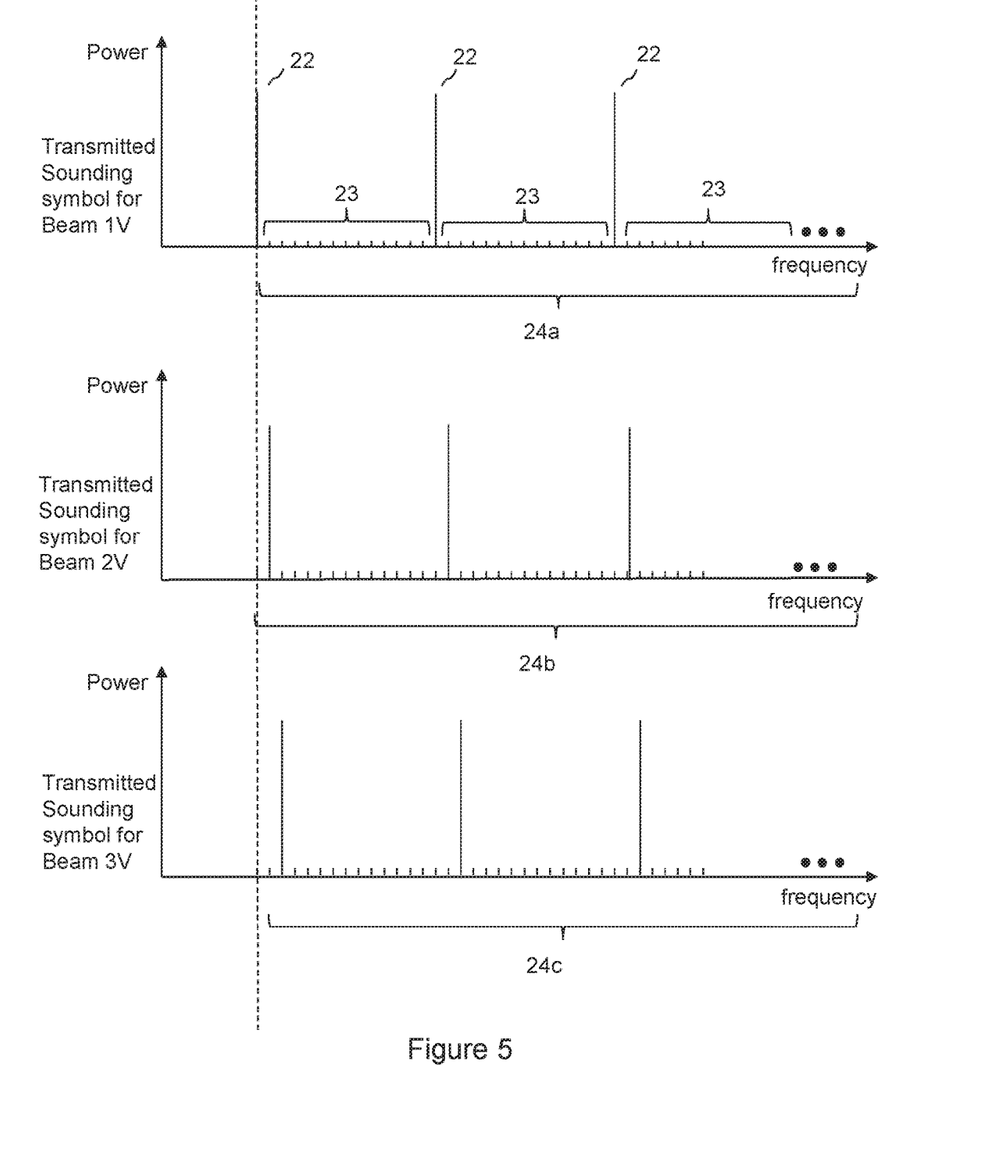
FIG. 5 is a schematic diagram showing sounding symbols in the frequency domain, for transmission on respective MU-MIMO beams, illustrating sounding symbols for a first subscriber module on V and H polarisations and for a second subscriber module on V polarisation in an embodiment of the invention.

FIG. 5 shows an example of sounding symbols 24a, 24b, 24c according to an embodiment of the invention. A transmitted sounding symbol is shown schematically for each of beams 1V, 2V and 3V. Each sounding symbol has a respective assigned set of sub-carriers 22, the assigned set of sub-carriers being energised and non-assigned subcarriers 23 being suppressed.

Figure 6A:
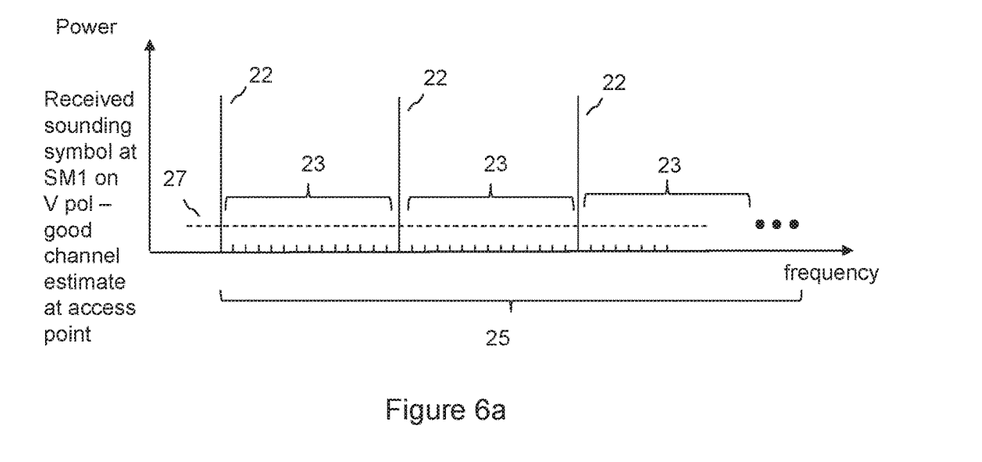
FIG. 6a is a schematic diagram showing a sounding symbol in the frequency domain as received at a first subscriber module, the weighting matrix at the access point having been determined on the basis of a good channel estimate in an embodiment of the invention.
Figure 6B:
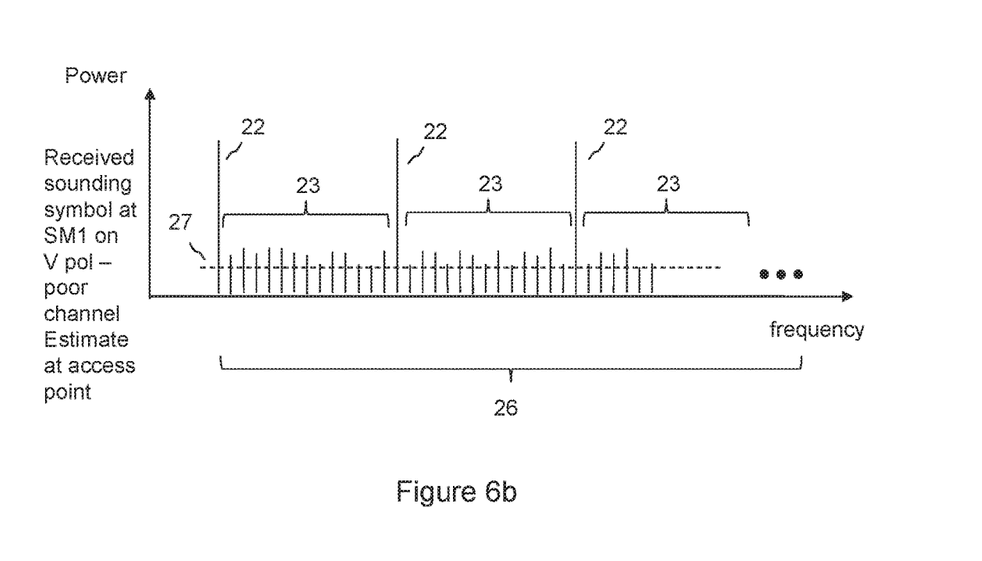
FIG. 6b is a schematic diagram showing a sounding symbol in the frequency domain as received at a first subscriber module, the weighting matrix at the access point having been determined on the basis of a poor channel estimate in an embodiment of the invention.

FIGS. 6a and 6b show a received sounding symbol as received at a subscriber module 2a, to which a beam 1V is transmitted as shown in FIG. 1, the beam 1V carrying sounding symbol 24a as shown in FIG. 5. FIG. 6a shows a sounding symbol 25 as it is received at the subscriber module SM1, in the case that the weightset used to generate the MU-MIMO beam is a good channel estimate, for example having been based on a recent channel sounding.

It can be seen that the subcarriers which were assigned to sounding symbols for other beams, for example subcarriers which were assigned to beams 2V and 3V as shown in FIG. 5, are received at a low level, below a threshold value 27.

By contrast, FIG. 6b shows a sounding symbol 26 as it is received at the subscriber module SM1, in the case that the weightset used to generate the MU-MIMO beam is a poor channel estimate, for example having been based on an out of date channel sounding, when for example the channel propagation conditions have changed significantly since the previous channel sounding.

It can be seen that the subcarriers which were assigned to sounding symbols for other beams, for example subcarriers which were assigned to beams 2V and 3V as shown in FIG. 5, are received at a higher level, above a threshold value 27.

In an embodiment of the invention, determining whether to send a response message comprises determining a level of at least one subcarrier that is not in the assigned set for the subscriber module at which the sounding symbol is received. So, for example, the level of one or more of the subcarriers 23 may be determined, and if the one or more subcarriers is above a threshold 27, then a response may be sent to the access point, which may comprise measurements for use in updating a channel estimate.

This allows an efficient method of determining whether or not to send a response message. If power above a threshold is received on non-assigned subcarriers, then the weighting matrix used to determine the MU-MIMO beams is may be assumed to have been based on inaccurate or out of date channel estimates, because if the weighting matrix had been based on accurate channel estimates, then it would be expected that subcarriers of sounding symbols transmitted on the MU-MIMO beams to the other subscriber modules of the sounding group would not be received, or would be received at a very low level.

In an embodiment of the invention, each subcarrier assigned in an assigned set for a sounding symbol is not allocated to another assigned set for another sounding symbol of the sounding group. This allows each sounding symbol to be orthogonal to each other sounding symbol of the first sounding group, thereby allowing efficient detection of interference between sounding symbols. As can be seen from FIG. 5, the subcarriers 22 assigned to the sounding symbol 24a for beam 1V are not assigned to the sounding symbols 24b and 24c for beams 2V and 3V respectively. Although the assigned subcarriers are shown regularly spaced in FIG. 5, this may not necessarily be the case.

In an embodiment of the invention, it may be determined whether or not to send the response message by a process comprising determining whether or not subcarriers that are not in the assigned set for the first subscriber module are received above a threshold relative to a received level of subcarriers in the assigned set; this determination may be based on a mean error of received power on subcarriers that are not in the assigned set. This allows a reliable estimate of the level of received power on non-assigned subcarriers.

Figure 7:
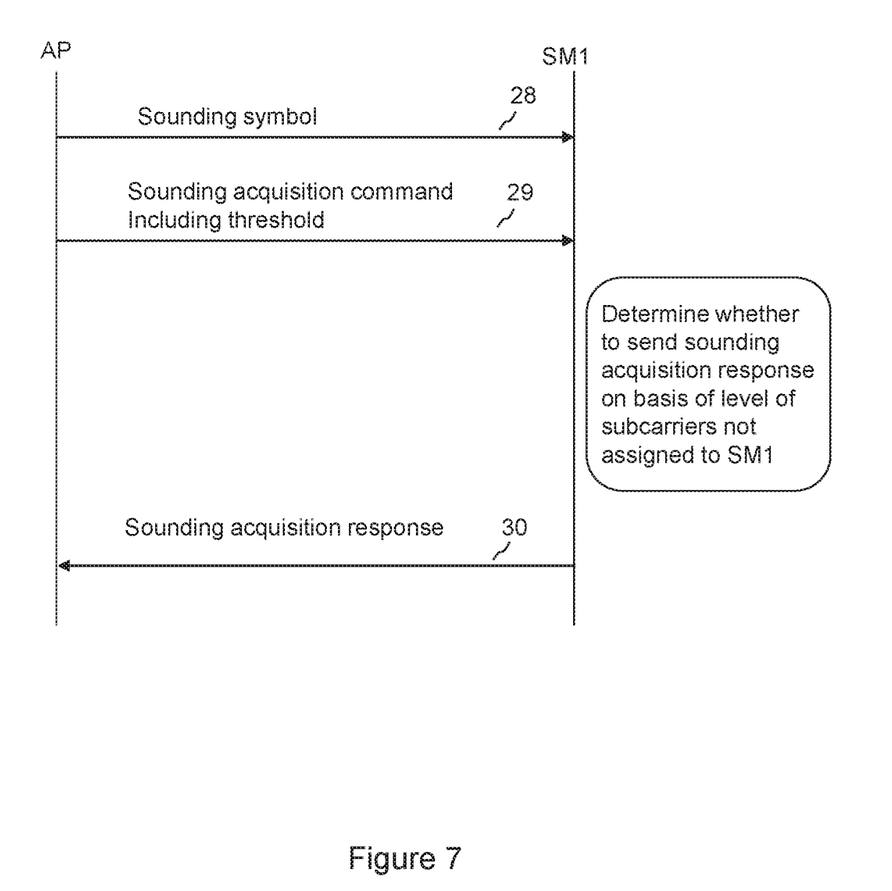
FIG. 7 is a schematic diagram showing an example of messaging between an access point and a subscriber module in an embodiment of the invention.

FIG. 7 shows an exchange of messages between the access point (AP) and a subscriber module (SM1) in an embodiment of the invention. First a sounding symbol is sent 28 from the access point to the subscriber module. This is then followed by a control message 29 including the threshold 27 sent from the access point to the subscriber module. This message 29 may be referred to as a sounding acquisition command. The threshold 27 may be used, as already mentioned, to determine whether or not to send a response message on the basis of comparing the level of subcarriers not assigned to the subscriber module with the threshold, which may be relative to relative to the maximum received tone level. Sending the threshold 27 allows the access point to control the amount of signaling traffic by controlling the sending of response messages.

The response message 30, which may be referred to as a sounding acquisition response, may be sent if it is determined that a measure of received power of subcarriers not assigned to the subscriber module is above the threshold.

The response message may comprise at least one metric indicating phase and/or amplitude of signals received on subcarriers that are not in the assigned set for the first subscriber module. This allows the channel estimate to be updated based on the indicated phase and amplitude. The message may additionally comprise a metric indicating phase and/or amplitude of signals received on subcarriers that are in the assigned set for the first subscriber module.

In an embodiment of the invention, the metric is an error vector. The error vector may comprise an average relative phase and amplitude relative to the phase and amplitude of subcarriers in the assigned set, which provides a convenient method of indicating amplitude and phase.

The response message may comprise a respective error vector for each assigned set of subcarriers. There may be an assigned set for each polarisation for each subscriber module in the sounding group, so this allows a separate update of the channel estimate for each assigned set.

In one embodiment of the invention, each assigned set may comprises 30 subcarriers and the sounding group may comprise 7 subscriber modules, there being an assigned set for each polarisation. On this basis there are 30×7×2, that is to say 420 subcarriers used in a sounding symbol.

In an embodiment of the invention, the response message comprises inphase and quadrature data for each subcarrier of the sounding symbol. This provides an alternative method to sending an average over subcarriers providing greater precision at the expense of signaling overhead.

A sounding symbol may be similar in construction to an OFDM symbol but is not typically used to send data. Each energised subcarrier typically has the same amplitude but has tone specific fixed phase offsets know at both ends of the link. The known phase offset is removed before estimating the error vector.

The level of received signal measured in a received sounding symbol may be typically relative to the maximum received tone level, and phase amplitude of subcarriers may be determined relative to the phase and amplitude of the assigned subcarriers. Common delay between subcarriers may be removed when determining received phase.

As part of the feedback in the response message, a small number of metrics may be returned for each tone set. This may be the average relative phase and average relative magnitude. Because errors are normally small, the error measures fed back to the access point may use non-uniformly quantisation to reduces feedback overhead.

The sounding symbol may be sent in a sounding mode which may be performed periodically as part of a time frame sequence including time frames for the transmission of payload data. This allows variations of the transmit channel with time and/or temperature to be calibrated.

In a time division duplex system, downlink signals transmitted from an access point and uplink signals transmitted from a subscriber module are transmitted at the same frequency. Alternating fixed-duration time periods, are allocated for uplink and downlink transmission respectively. An uplink and a downlink frame may form a time division duplex frame, which is typically divided into timeslots, each timeslot typically being for communication with a subscriber module, or in the case of MU-MIMO operation, with a group of subscriber modules. The access point may switch from one mode of operation to another between timeslots, for example from sector mode to MU-MIMO mode. Transmission of sounding symbols may be performed within a timeslot.

Figure 8:
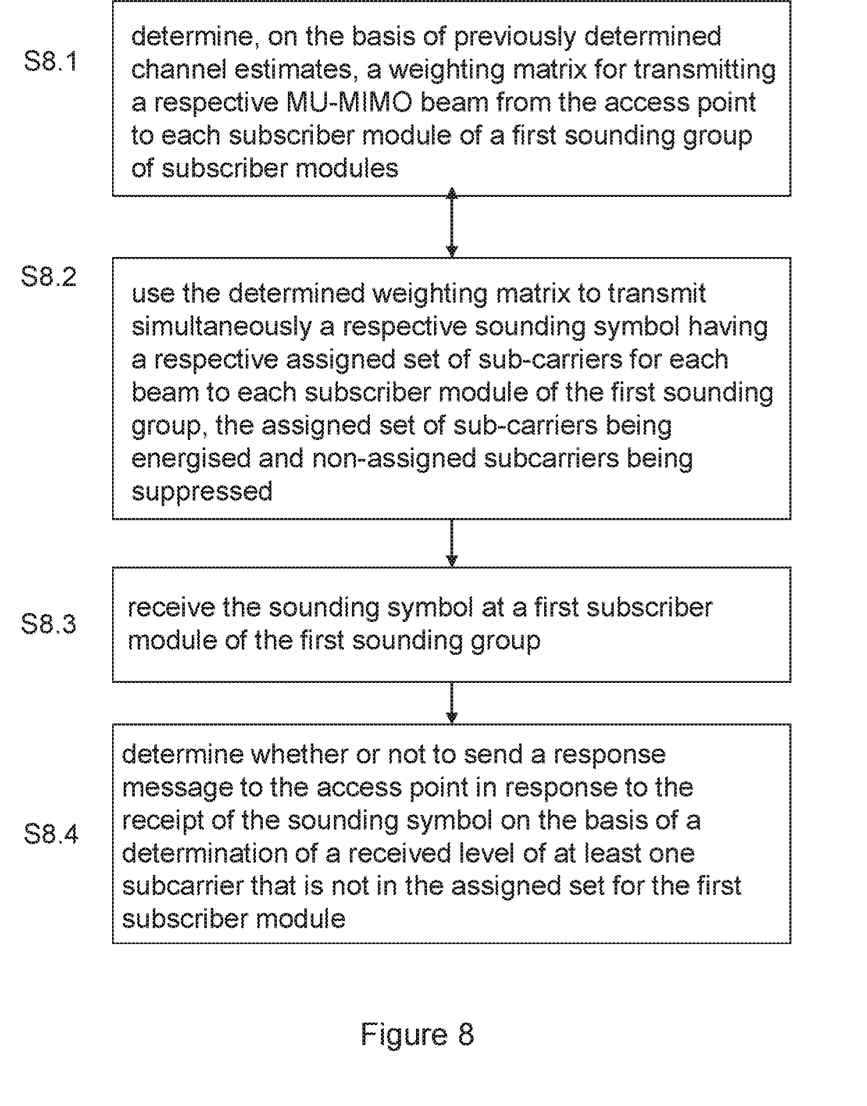
FIG. 8 is a flow diagram of a method according to an embodiment of the invention.

FIG. 8 is a flow chart of a method of channel sounding in an embodiment of the invention, comprising steps S8.1 to S8.4.

It will be understood that the method of embodiments of the invention may be implemented by an electronic system comprising one or more processors, which may comprise program code held in a memory configured to cause the processor to perform the method. The processor or processors may comprise one or more digital signal processors, and/or programmable logic arrays.

Returning to FIG. 1, the subscriber modules 2a to 2g may have antennas which have an aperture defined for example by a reflector, and each antenna element may comprise a probe for receiving and/or transmitting a respective polarisation from/to the aperture. The antenna is typically installed so as to align the peak of the transmit/receive radiation pattern in the direction of the access point 1, which is typically installed on a tower. A command sent to each subscriber module may comprise a map indicating a scheduling of radio resource and/or polarisation to the subscriber module as a function of time. The map may indicate respective allocations to several subscriber units as a function of time, typically all subscriber units served by an access point. The map may indicate, for example, time, polarisation, and/or frequency allocation for transmission and/or reception. The scheduling of radio resource and polarisation may be updated periodically, the period between updates being determined by a scheduler at the access point.

A specific example of an access point according to an embodiment of the invention is given by a point-to-multipoint (PMP) Access Point (AP) with a seven-element dual-polarised adaptive array smart antenna and multi-user MIMO (MU-MIMO) capabilities. It will be understood that embodiments of the invention are not limited to this example. The access point in this example is designed for outdoor deployment as an AP with sector coverage in a PMP network. Units may be deployed in multiples to provide 360° coverage from a tower or rooftop. The access point may be a complete radio transceiver operating in the frequency range 5150 MHz to 5925 MHz, using Time Division Duplex (TDD) separation of the uplink and downlink directions.

The access point may include an integrated dual-polarised seven-element adaptive array smart antenna. Seven identical dual-polarised antenna elements and 14 associated transceiver chains may be contained within a single rigid assembly, with each antenna element connected directly to two transceiver chains using printed conductors and wireless via connections. The integration of the components ensures that the spacing and alignment of the antenna elements is known and constant.

Each antenna element may consist of a vertical column of eight radiating patches and separate passive feed networks for horizontal and vertical polarisations. A single element may have a relatively narrow beamwidth (about 8°) in the elevation direction, and a broader beamwidth (about 80°) in the azimuth direction. The gain of each antenna element (that is to say, each column of eight patches) is about 14 dBi.

The overall antenna assembly may contain 56 patches, in an array that is seven elements (seven patches) wide and one element (eight patches) high.

The antenna array may provide high isolation between antenna elements. The coupling loss between antenna elements may be greater than 30 dB; this enables the device to model smart antenna operation more accurately.

The integrated assembly in this example does not make use of any connectors between the antenna elements and the associated electronics, and does not provide any test points that could be used to make conducted measurements.

In this example, the maximum output power of a single transmitter chain is about 10 dBm, or 13 dBm for each dual-polarised pair of chains The associated Subscriber Module (SM) devices may contain a directional dual-polarised antenna with two transceiver chains. The SMs may support a single data stream using polarisation diversity or polarisation multiplexing. In MU-MIMO operation, the AP may support several, for example seven, parallel data streams, where each stream is associated with a different SM device.

The access point in this example supports smart antenna modes including MU-MIMO data transmission mode and sounding mode. The access point may use the MU-MIMO mode to transmit and receive data in several parallel streams where each stream involves a different SM. The MU-MIMO operation consists of beamforming to maximise the uplink and downlink signal in one stream for each wanted SM, and null-steering to minimise the uplink and downlink signals for SMs that are associated with the other parallel streams. The resulting antenna beams will necessarily be at different azimuth angles such that the antenna beams are substantially non-overlapping.

The MU-MIMO data transmission mode may be invoked when suitable orthogonal groups of SMs have been identified, and where buffered data is queued, ready to be transmitted to or received from these SMs. For MU-MIMO data transmission mode, operation may use either polarisation diversity, using cyclic delay diversity (CDD); or polarisation multiplexing.

In the polarisation diversity MIMO mode, the same data is present in both polarisations during the same symbol period, and the two channels are therefore considered to be partially correlated. In the polarisation multiplexing MIMO mode, the data stream is shared between the two polarisations, and the two channels are therefore considered to be completely uncorrelated.

The channel conditions needed for MU-MIMO operation are similar to the channel conditions needed for polarisation multiplexing, and the combination of polarisation diversity and MU-MIMO operation may occur relatively rarely.

In an embodiment of the invention the coordinates of each A and B tone, as shown in FIG. 2, may be each multiplied by a set of 14 amplitude and phase weights generated by a beamforming function to create seven H and seven V inputs to the following stage. In each of the 14 transmitter chains, the weighted tone sets are passed to the IFFT stage to generate a series of in-phase and quadrature time-domain samples for an OFDM symbol. The unit then adds a complex cyclic prefix to the time domain signals and converts the I and Q signals to analogue waveforms. The analogue signals are applied to an up-converter to provide the modulated RF output. The 14 modulated RF signals are then amplified and applied in pairs to the H and V ports of the seven dual-polarised antenna elements.

Application firmware in the access point may compute the transmitter gain, and amplitude and phase weights for the combining matrix, to provide the required MU-MIMO beam patterns. This operation may be based on an accurate model of smart antenna operation, in which the resultant signal strength at any azimuth angle is determined as the superposition of the signals radiated by the individual antenna elements. This model may automatically and intrinsically allow for array gain in the smart antenna.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of channel sounding for a multi user multiple input multiple output (MU-MIMO) wireless communication network comprising an access point and a plurality of subscriber modules, comprising:
    forming a respective MU-MIMO beam from the access point to each subscriber module of a first sounding group of subscriber modules by applying a beamforming weightset to a weighting matrix, the beamforming weightset having been determined on the basis of previously determined channel estimates;
    using each MU-MIMO beam to transmit simultaneously a respective sounding symbol, each respective sounding symbol being different from each other sounding symbol of the first sounding group;
    receiving a first sounding symbol at a first subscriber module of the first sounding group; and
    determining whether to send a response message to the access point in response to the receipt of the first sounding symbol on the basis of a determination of a received level of interference to the first sounding symbol,
    wherein:
    each sounding symbol has a respective assigned set of sub-carriers, the assigned set of sub-carriers being energised and non-assigned subcarriers being suppressed, wherein each subcarrier assigned in an assigned set for a sounding symbol is not allocated to another assigned set for another sounding symbol of the first sounding group; and
    said determining whether to send a response message comprises determining a level of at least one subcarrier that is not in the assigned set for the first subscriber module, wherein said determining whether to send the response message comprises determining whether or not subcarriers that are not in the assigned set for the first subscriber module are received above a threshold relative to a received level of subcarriers in the assigned set.

2. The method according to claim 1, wherein said determining whether or not subcarriers that are not in the assigned set for the subscriber module are received above the threshold is based on a mean error of received power on subcarriers that are not in the assigned set.

3. The method according to claim 1, wherein the threshold is sent in a control message from the access point to the first subscriber module.

4. The method according to claim 1, wherein the response message comprises at least one metric indicating phase and/or amplitude of signals received on subcarriers that are not in the assigned set for the first subscriber module.

5. The method according to claim 4, wherein the metric is an error vector.

6. The method according to claim 5, wherein the error vector comprises an average relative phase and amplitude relative to the phase and amplitude of subcarriers in the assigned set.

7. The method according to claim 5, wherein the response message comprises a respective error vector for each assigned set, wherein there is an assigned set for each polarisation for each subscriber module in the first sounding group.

8. The method according to claim 7, wherein each assigned set comprises 30 subcarriers and the first sounding group comprises 7 subscriber modules, there being an assigned set for each polarisation.

9. The method according to claim 1, comprising selecting subscriber modules to be members of the first sounding group on the basis of angular separation.

10. The method according to claim 9, wherein the first sounding group does not have the same members as a MU-MIMO group for transmitting payload data.

11. A multi user multiple input multiple output (MU-MIMO) wireless communication network comprising an access point and at least a first subscriber module of a first sounding group of subscriber modules,
the access point comprising a processor configured to cause the access point to form a respective MU-MIMO beam from the access point to each subscriber module of the first sounding group of subscriber modules by applying a beamforming weightset to a weighting matrix, the beamforming weightset having been determined on the basis of previously determined channel estimates, and to use each MU-MIMO beam to transmit simultaneously a respective sounding symbol, each respective sounding symbol being different from each other sounding symbol of the first sounding group, and
the first subscriber module of the first sounding group, comprising a processor configured to cause the first subscriber module to receive a first sounding symbol transmitted to the first subscriber module in a respective MU-MIMO beam, and to determine whether to send a response message to the access point in response to the receipt of the first sounding symbol on the basis of a determination of a received level of interference to the first sounding symbol,
wherein:
each sounding symbol has a respective assigned set of sub-carriers, the assigned set of sub-carriers being energised and non-assigned subcarriers being suppressed, wherein each subcarrier assigned in an assigned set for a sounding symbol is not allocated to another assigned set for another sounding symbol of the first sounding group; and
the processor of the first subscriber module is configured to determine whether to send a response message by a process comprising determining a level of at least one subcarrier that is not in the assigned set for the first subscriber module, wherein the processor of the first subscriber module is configured to determine whether or not to send the response message by a process comprising determining whether or not subcarriers that are not in the assigned set for the first subscriber module are received above a threshold relative to a received level of subcarriers in the assigned set.

12. A method of operating an access point for a multi user multiple input multiple output (MU-MIMO) wireless communication network comprising the access point and a plurality of subscriber modules, the method comprising:
forming a respective MU-MIMO beam from the access point to each subscriber module of a first sounding group of subscriber modules by applying a beamforming weightset to a weighting matrix, the beamforming weightset having been determined on the basis of previously determined channel estimates; and
using each MU-MIMO beam to transmit simultaneously a respective sounding symbol, each respective sounding symbol being different from each other sounding symbol of the first sounding group, and each sounding symbol has a respective assigned set of sub-carriers, the assigned set of sub-carriers being energised and non-assigned subcarriers being suppressed,
wherein each subcarrier assigned in an assigned set for a sounding symbol is not allocated to another assigned set for another sounding symbol of the first sounding group,
whereby to enable each subscriber module to determine whether or not to send a response message to the access point in response to the receipt of the respective sounding symbol on the basis of a determination of a received level of interference to the first sounding symbol, the determination comprising determining a level of at least one subcarrier that is not in the assigned set for the first subscriber module,
wherein determining whether or not to send the response message comprises determining whether or not subcarriers that are not in the assigned set for the first subscriber module are received above a threshold relative to a received level of subcarriers in the assigned set.

13. An access point for use in a multi user multiple input multiple output (MU-MIMO) wireless communication network comprising the access point and a plurality of subscriber modules, the access point comprising a processor configured to cause the access point to:
form a respective MU-MIMO beam from the access point to each subscriber module of a first sounding group of subscriber modules by applying a beamforming weightset to a weighting matrix, the beamforming weightset having been determined on the basis of previously determined channel estimates; and
use each MU-MIMO beam to transmit simultaneously a respective sounding symbol, each respective sounding symbol being different from each other sounding symbol of the first sounding group, and each sounding symbol having a respective assigned set of sub-carriers, the assigned set of sub-carriers being energised and non-assigned subcarriers being suppressed,
wherein each subcarrier assigned in an assigned set for a sounding symbol is not allocated to another assigned set for another sounding symbol of the first sounding group,
whereby to enable each subscriber module to determine whether or not to send a response message to the access point in response to the receipt of the respective sounding symbol on the basis of a determination of a received level of interference to the first sounding symbol, the determination comprising determining a level of at least one subcarrier that is not in the assigned set for the first subscriber module,
wherein determining whether or not to send the response message comprises determining whether or not subcarriers that are not in the assigned set for the first subscriber module are received above a threshold relative to a received level of subcarriers in the assigned set.

14. A method of operating a subscriber module in a multi user multiple input multiple output (MU-MIMO) wireless communication network comprising an access point and a plurality of subscriber modules, the method comprising:

receiving a first sounding symbol at the subscriber module, the subscriber module being in a first sounding group of subscriber modules, the first sounding symbol having been transmitted from the access point in a first MU-MIMO beam, the first MU-MIMO beam having been formed using a weighting matrix to form a respective MU-MIMO beam from the access point to each subscriber module of the first sounding group to transmit simultaneously a respective sounding symbol for each beam to each subscriber module, each respective sounding symbol being different from each other sounding symbol of the first sounding group, the beamforming weightset for the weighting matrix having being determined on the basis of previously determined channel estimates; and determining whether to send a response message to the access point in response to the receipt of the first sounding symbol on the basis of a determination of a received level of interference to the first sounding symbol, wherein:

each sounding symbol has a respective assigned set of sub-carriers, the assigned set of sub-carriers being energised and non-assigned subcarriers being suppressed, wherein each subcarrier assigned in an assigned set for a sounding symbol is not allocated to another assigned set for another sounding symbol of the first sounding group; and said determining whether to send a response message comprises determining a level of at least one subcarrier that is not in the assigned set for the first subscriber module, wherein said determining whether to send the response message comprises determining whether or not subcarriers that are not in the assigned set for the first subscriber module are received above a threshold relative to a received level of subcarriers in the assigned set.

15. A subscriber module for use in a multi user multiple input multiple output (MU-MIMO) wireless communication network comprising an access point and a plurality of subscriber modules, the subscriber module comprising a processor configured to cause the subscriber module to:

receive a first sounding symbol at the subscriber module, the subscriber module being in a first sounding group of subscriber modules, the first sounding symbol having been transmitted from the access point in a first MU-MIMO beam, the first MU-MIMO beam having been formed using a weighting matrix to form a respective MU-MIMO beam from the access point to each subscriber module of the first sounding group to transmit simultaneously a respective sounding symbol for each beam to each subscriber module, each respective sounding symbol being different from each other sounding symbol of the first sounding group, the beamforming weightset for the weighting matrix having being determined on the basis of previously determined channel estimates; and determine whether to send a response message to the access point in response to the receipt of the first sounding symbol on the basis of a determination of a received level of interference to the first sounding symbol, wherein:

each sounding symbol has a respective assigned set of sub-carriers, the assigned set of sub-carriers being energised and non-assigned subcarriers being suppressed, wherein each subcarrier assigned in an assigned set for a sounding symbol is not allocated to another assigned set for another sounding symbol of the first sounding group; and the processor is configured to determine whether or not to send a response message by a process comprising determining a level of at least one subcarrier that is not in the assigned set for the first subscriber module, wherein said determining whether or not to send the response message comprises determining whether or not subcarriers that are not in the assigned set for the first subscriber module are received above a threshold relative to a received level of subcarriers in the assigned set.

* * * * *